US010928530B1

(12) United States Patent
Wei et al.

(10) Patent No.: US 10,928,530 B1
(45) Date of Patent: Feb. 23, 2021

(54) METHOD FOR SYNCHRONIZING ACOUSTIC ASYNCHRONOUS SERIAL SIGNALS WHILE DRILLING

(71) Applicant: Institute of Geology and Geophysics, Chinese Academy of Sciences, Beijing (CN)

(72) Inventors: Fuqiang Wei, Beijing (CN); Yuntao Sun, Beijing (CN); Wenxuan Chen, Beijing (CN); Wenxiu Zhang, Beijing (CN); Jian Zheng, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 0 days.

(21) Appl. No.: 16/988,350

(22) Filed: Aug. 7, 2020

(30) Foreign Application Priority Data

Sep. 12, 2019 (CN) .......................... 201910865440.6

(51) Int. Cl.
*G01V 1/22* (2006.01)
*E21B 47/12* (2012.01)
(Continued)

(52) U.S. Cl.
CPC ................ *G01V 1/22* (2013.01); *E21B 47/12* (2013.01); *E21B 47/14* (2013.01); *G01V 1/46* (2013.01);
(Continued)

(58) Field of Classification Search
CPC ...... G01V 1/22; G01V 2200/16; E21B 47/12; E21B 47/14
See application file for complete search history.

(56) References Cited

U.S. PATENT DOCUMENTS 3,925,749 A * 12/1975 McLaughlin ........... E21B 47/12
340/854.9
6,026,915 A 2/2000 Smith et al.
(Continued)

FOREIGN PATENT DOCUMENTS

CN 101929333 A 12/2010
CN 103235340 A 8/2013
(Continued)

*Primary Examiner* — Ian J Lobo
(74) *Attorney, Agent, or Firm* — Novick, Kim & Lee, PLLC; Allen Xue

(57) ABSTRACT

In a method for synchronizing acoustic asynchronous serial signals while drilling, communication and high-voltage signal isolation between a transmitting terminal and a receiving master control board are realized in an asynchronous serial communication way. The receiving master control board serving as a master control terminal configures parameters for the transmitting terminal in the asynchronous serial communication way and controls the excitation of a sound source. The transmitting terminal is a synchronous sound source excitation signal initiator; signal synchronization is realized under an asynchronous communication condition due to the coordination of the transmitting terminal and the receiving master control board; the transmitting terminal includes a plurality of transmitting boards, and asynchronous serial communication between each of the transmitting boards and the receiving master control board is realized through two data lines R+ and R.

8 Claims, 3 Drawing Sheets

(51) Int. Cl.
*E21B 47/14* (2006.01)
*G01V 1/46* (2006.01)

(52) U.S. Cl.
CPC ...... *G01V 2200/12* (2013.01); *G01V 2200/16* (2013.01)

(56) References Cited

U.S. PATENT DOCUMENTS

| | | | | |
|---|---|---|---|---|
| 6,348,876 | B1* | 2/2002 | Wei | E21B 47/12 340/854.4 |
| 7,936,637 | B2* | 5/2011 | Shori | G11C 7/1093 365/233.1 |
| 9,007,231 | B2* | 4/2015 | Macpherson | G01V 1/26 340/853.7 |
| 10,400,587 | B2* | 9/2019 | Roberson | E21B 47/13 |
| 2005/0035875 | A1* | 2/2005 | Hall | G01V 1/26 340/853.1 |
| 2013/0321164 | A1* | 12/2013 | Troite | E21B 47/01 340/853.1 |
| 2018/0112465 | A1 | 4/2018 | Ritchie et al. | |
| 2020/0109623 | A1* | 4/2020 | Vinay | E21B 47/06 |

FOREIGN PATENT DOCUMENTS

| | | |
|---|---|---|
| CN | 104407051 A | 3/2015 |
| CN | 104481503 A | 4/2015 |
| CN | 107340745 A | 11/2017 |
| CN | 108562906 A | 9/2018 |
| CN | 108979628 A | 12/2018 |
| CN | 109025969 A | 12/2018 |
| CN | 109117410 A | 1/2019 |
| CN | 208848069 U | 5/2019 |

\* cited by examiner

METHOD FOR SYNCHRONIZING ACOUSTIC ASYNCHRONOUS SERIAL SIGNALS WHILE DRILLING

FIELD

The present disclosure relates to the technical field of logging while drilling and in particular to a method for synchronizing acoustic asynchronous serial signals while drilling.

BACKGROUND

Different from a cable acoustic logging instrument, an acoustic logging while drilling instrument is restricted by a transmission rate during acoustic logging while drilling, so that both control and data processing are rapidly completed underground. The acoustic logging while drilling instrument is complex in transmitting and receiving sequence control and large in data calculation amount, in order to guarantee the real-time property, the control and data processing processes are required to be reasonably scheduled, and the overall work of the instrument is required to be coordinated.

An electronic system of the acoustic logging while drilling instrument is composed of parts such as an acoustic transmitting circuit, a signal receiving and processing circuit, a data acquisition circuit, a receiving master control circuit and a power circuit. The transmitting circuit excites a sound source to generate an acoustic signal with a certain frequency and waveform after receiving an excitation signal.

Now, a quadrupole sound source is adopted as the latest generation of sound source mode, while the synchronization performances and driving waveforms of driving signals among sound sources will directly affect the quality of signals received by the data acquisition circuit. The control and data processing circuit should keep the time interval between the transmitting circuit and the signal receiving circuit precise and stable, and thus, the acoustic signal transmitted by a transmitting terminal may be correctly received.

Problems existing in the prior art are as follows:

a high-voltage driving signal with the voltage of higher than 1000V is required when the transmitting terminal excites the quadrupole sound source to generate acoustic waves, while disturbance resulted from the high voltage will affect the normal operation of the control and data processing circuit.

Data command interaction between a transmitting board and a receiving master control board is generally performed in an RS485 asynchronous serial communication way, while the precise synchronization of a transmitted signal and an acquired signal may not be realized by existing asynchronous serial communication.

The time difference $\Delta t = t_2 - t_1$ of a moment $t_1$ when the transmitting circuit excites the sound source and a moment $t_2$ when the signal receiving circuit starts to acquire signals should be kept precise and stable, and thus, it may be ensured that effective signals may be acquired every time.

When signal synchronization is performed in the asynchronous serial communication way, namely a transmitting circuit board delays the excitation of the sound source for $t_3$ after successfully receiving a synchronization command frame, a receiving master control circuit delays the starting of acquisition for $t_4$ after receiving a "received successfully" command returned by the transmitting circuit board, then, the time difference of the moment when the sound source is excited and the moment when the signals are started to be acquired is $\Delta t = t_4 - t_3$.

Since the command is transmitted in the asynchronous serial communication way, if the baud rate is 9600 dps, the moment when the command is sent every time may fluctuate within 1/9600s in the case that other conditions are unchanged, the time difference of the moment when the sound source is excited and the moment when the signals are started to be acquired is $\Delta t$ which may also fluctuate within 1/9600s, thereby resulting in the time window offset of each signal acquisition.

SUMMARY

The present disclosure aims at providing a method for synchronizing acoustic asynchronous serial signals while drilling to overcome defects in the prior art, and by using the method, signal isolation between a transmitting terminal and a receiving terminal may be realized, and precise synchronization may be guaranteed.

A technical solution adopted by the present disclosure is as follows:

Provided is a method for synchronizing acoustic asynchronous serial signals while drilling, communication and high-voltage signal isolation between a transmitting terminal and a receiving master control board are realized in an asynchronous serial communication way; the receiving master control board serving as a master control terminal configures parameters for the transmitting terminal in the asynchronous serial communication way and controls the excitation of a sound source; the transmitting terminal is a synchronous sound source excitation signal initiator; and signal synchronization is realized under an asynchronous communication condition due to the coordination of the transmitting terminal and the receiving master control board.

Further, the transmitting terminal includes a plurality of transmitting boards, and asynchronous serial communication between each of the transmitting boards and the receiving master control board is realized through two data lines R+ and R. The receiving master control board and the transmitting boards are directly hung on the two data lines (which are equivalent to a bus).

Further, the method specifically includes:

S1, configuring, by a micro-control unit of the receiving master control board, parameters for the plurality of transmitting boards through a driving chip, and sequentially returning, by the plurality of transmitting boards, a "received successfully" command to the receiving master control board after receiving the configured parameters;

S2, sending, by the micro-control unit of the receiving master control board, a command for exciting the sound source to the plurality of transmitting boards in a broadcast form through the driving chip, meanwhile, changing a configuration of a pin, corresponding to R+, of the micro-control unit of the receiving master control board from a serial communication mode to a universal input port mode, and starting a rising edge interrupt function of the pin corresponding to R+ so as to be ready to acquire a first rising edge, caused when the transmitting terminal returns the command, of the corresponding pin;

S3, after the transmitting boards successfully receive the command for exciting the sound source, starting to acquire the first rising edge of R+ by the plurality of transmitting boards;

S4, returning, by the first one in the transmitting boards, the "received successfully" command to the receiving master control board after starting interrupt of the first rising edge of R+ by utilizing the parallel processing performance of a field-programmable gate array, and making the remaining transmitting boards not return commands;

S5, after the plurality of transmitting boards acquire the first rising edge, stopping acquiring the rising edge of the signal line R+, meanwhile, starting to time by using a timer, simultaneously exciting the sound source after time $T_1$ to guarantee signal synchronization of four transmitting boards at the transmitting terminal;

S6, after the micro-control unit (MCU) of the receiving master control board acquires the first rising edge of R+, reconfiguring the pin corresponding to R+ to be in the serial communication mode so as to be ready for the next communication, then, starting the timer, and sending a command for starting to acquire an acoustic signal to a data acquisition circuit in a rising edge interrupt way after the time $T_2$ is passed;

S7, acquiring, by the data acquisition circuit, data with a certain length according to a sampling rate with a certain frequency, wherein the data acquisition circuit starts to acquire the data after the time $\Delta T = T_2 - T_1$ is passed from sending the acoustic signal by the sound source.

Further, the number of the transmitting boards is 4.

Further, in step S1, the parameters include working mode, dead time, excitation frequency and waiting time; and the driving chip is an RS485 chip.

Further, in step S2, the highest acquiring frequency for the rising edge is set as 100 MHz.

Further, in step S3, the frequency for the transmitting boards to acquire the first rising edge of R+ is 25 MHz.

Further, in step S3, the highest frequency for the transmitting boards to acquire the first rising edge of R+ is the clock frequency of the field-programmable gate array (FPGA).

Further, in step S5, the precision of the timer is the clock precision of a crystal oscillator.

Further, the signal synchronization precision reaches to be identical to the crystal oscillator frequency, and the maximum error is controlled within one crystal oscillator clock, so that a requirement for the precision of acoustic logging is met.

The present disclosure has the beneficial effects that:

1. The problem of signal synchronization of a transmitting terminal and a receiving terminal in an acoustic logging instrument is solved. By using the method provided by the present disclosure, the synchronization precision may reach to be identical to the crystal oscillator frequency, and the maximum error may be controlled within one crystal oscillator clock, so that the requirement for the precision of acoustic logging is met.

2. Hardware connection between the transmitting terminal and the receiving terminal is simplified. By using the method provided by the present disclosure, data transmission and signal synchronization may be completed by only using two signal lines, no additional signal lines are required as synchronizing signals. Meanwhile, the hardware connection between the transmitting terminal and the receiving terminal is identical to universal asynchronous serial communication connection, universal hardware is compatible, and hardware connection does not need to be changed.

3. High-voltage isolation between the transmitting terminal and the receiving terminal is realized. By using the method provided by the present disclosure, the transmitting terminal and the receiving terminal are connected in an asynchronous serial communication way, common ground between the transmitting terminal and the receiving terminal is not needed, and thus, a strong-current and high-voltage signal generated by the transmitting terminal may not affect data acquisition and control at the receiving terminal.

DETAILED DESCRIPTION OF THE EMBODIMENTS

The specific embodiments of the present disclosure are described below in detail in combination with the specific accompanying drawings. It should be noted that technical features or combinations thereof described in the following embodiments should not be regarded to be isolated, they can be combined with each other to achieve a better technical effect. In the accompanying drawings of the following embodiments, same numerals appearing in each accompanying drawing indicate same features or components, and therefore, they can be applied to different embodiments.

Technical problems to be solved by the present disclosure are that:

four lines for clock signals ClK, ground signals GND and differential signals R+ and R− are needed in synchronous serial communication. Although the accurate synchronization of signals may be realized by the synchronous serial communication, the ground signals GND at a transmitting terminal and a receiving terminal should be connected together, and therefore, a high-voltage excitation signal generated by the transmitting terminal when the transmitting terminal excites a sound source may affect signal acquisition and data processing at the receiving terminal by virtue of the signals GND; moreover, the four signal lines are required for communication transmission in the synchronous serial communication, while two signal lines are only required for communication transmission in asynchronous serial communication adopted in the present disclosure, so that a hardware structure is simplified, and the cost is reduced.

Figure 1:
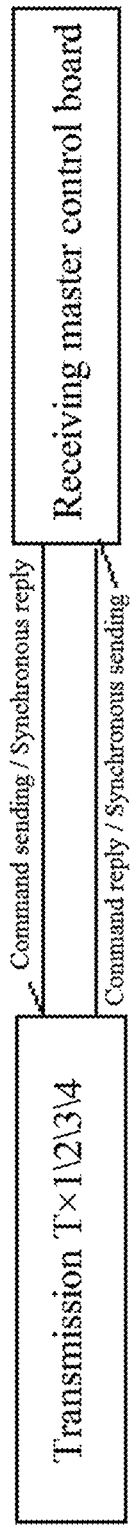
FIG. 1 is a schematic diagram of a method for synchronizing acoustic asynchronous serial signals while drilling in an embodiment of the present disclosure.

The present disclosure provides a method for synchronizing acoustic asynchronous serial signals while drilling, in which communication and high-voltage signal isolation between a transmitting terminal and a receiving master control board are realized in an asynchronous serial communication way; the receiving master control board serving as a master control terminal configures parameters for the transmitting terminal in the asynchronous serial communication way and controls the excitation of a sound source; the transmitting terminal is a synchronous sound source excitation signal initiator; and signal synchronization is realized under an asynchronous communication condition due to the coordination of the transmitting terminal and the receiving master control board. The principle of the present disclosure is shown as FIG. 1.

Figure 2:
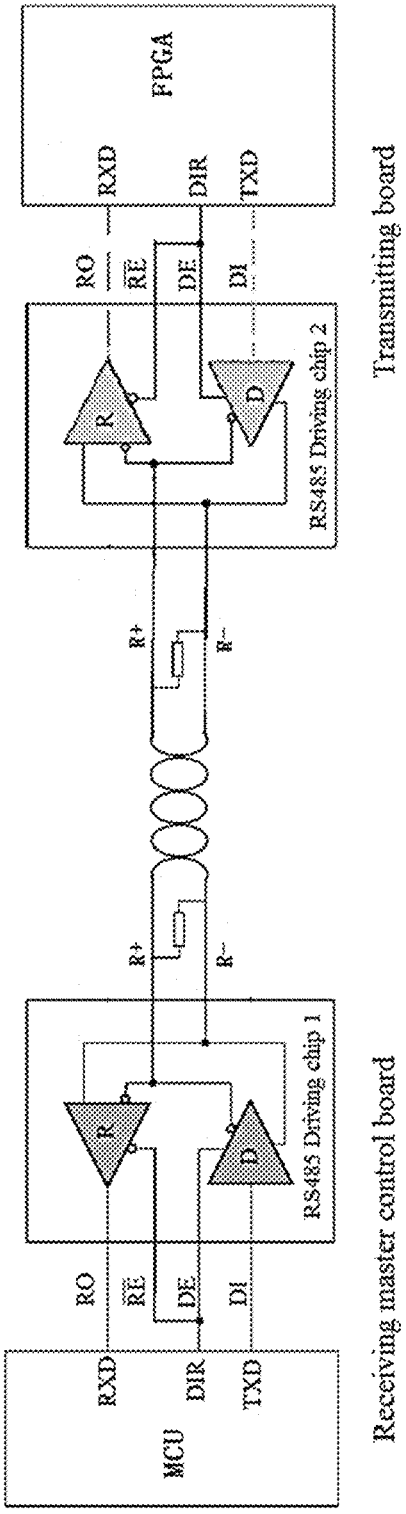
FIG. 2 is a schematic diagram of a hardware structure in the method for synchronizing acoustic asynchronous serial signals while drilling in the embodiment of the present disclosure.

In the present embodiment, the transmitting terminal includes one transmitting board and one receiving master control board, the receiving master control board is provided with a micro-control unit (MCU) and an RS485 driving chip 1, the transmitting board is provided with a field-programmable gate array (FPGA) and an RS485 driving chip 2, and both the FPGA of the transmitting board and the MCU of the receiving master control board may achieve an asynchronous serial communication function. The transmitting board is connected with the receiving master control board by two differential signal lines R+ and R−. The hardware structure in the embodiment of the present disclosure is shown as FIG. 2.

In one specific embodiment, the method provided by the present disclosure includes the specific steps:

S1, After a system is electrified, a micro-control unit (MCU) of a receiving master control board sequentially configures parameters, including working mode, dead time, excitation frequency and waiting time, for four transmitting boards by roll call through an RS485 driving chip. The four transmitting boards sequentially return a "received successfully" command after successfully receiving the configured parameters.

S2, The MCU of the receiving master control board sends a command for exciting a sound source to the four transmitting boards in a broadcast form through the RS485 driving chip, meanwhile, a configuration of a pin, corresponding to R+, of the MCU of the receiving master control board is changed from a serial communication mode to a universal input port mode, and a rising edge interrupt function of the pin corresponding to R+ is started so as to be ready to acquire a first rising edge, caused when the transmitting terminal returns the command, of the corresponding pin, wherein the highest acquiring frequency for the rising edge may be set as 100 MHz.

S3, After successfully receiving the command for exciting the sound source at the same time, the four transmitting boards start to acquire the first rising edge of R+, wherein the highest acquiring frequency is the clock frequency of a field-programmable gate array (FPGA) and is generally 25 MHz.

S4, The first transmitting board returns the "received successfully" command to a control and data processing board after starting interrupt of the first rising edge of R+ by utilizing the parallel processing performance of the FPGA, and the second to fourth transmitting boards do not return commands.

S5, After the four transmitting boards acquire the first rising edge, acquiring the rising edge of the signal line R+ is stopped, meanwhile, a timer is started for timing, monopole emission or quadrupole emission is implemented according to the received configured parameters after the time $T_1$ is passed so as to achieve different emission modes and also guarantee signal synchronization of the four transmitting boards at the transmitting terminal, wherein the precision of the timer is the clock precision of a crystal oscillator.

S6, After the MCU of the receiving master control board acquires the first rising edge of R+, the corresponding pin is reconfigured to be in the serial communication mode so as to be ready for the next communication, then, the timer is started, and a command for starting to acquire an acoustic signal is sent to a data acquisition circuit in a rising edge interrupt way after the time $T_2$ is passed.

S7, The data acquisition circuit acquires data with a certain length according to a sampling rate with a certain frequency, it is equivalent that the data acquisition circuit starts to acquire the data after the time $\Delta T=T_2-T_1$ is passed from sending the acoustic signal by the sound source, and $\Delta T$ may guarantee high enough precision.

Figure 3:
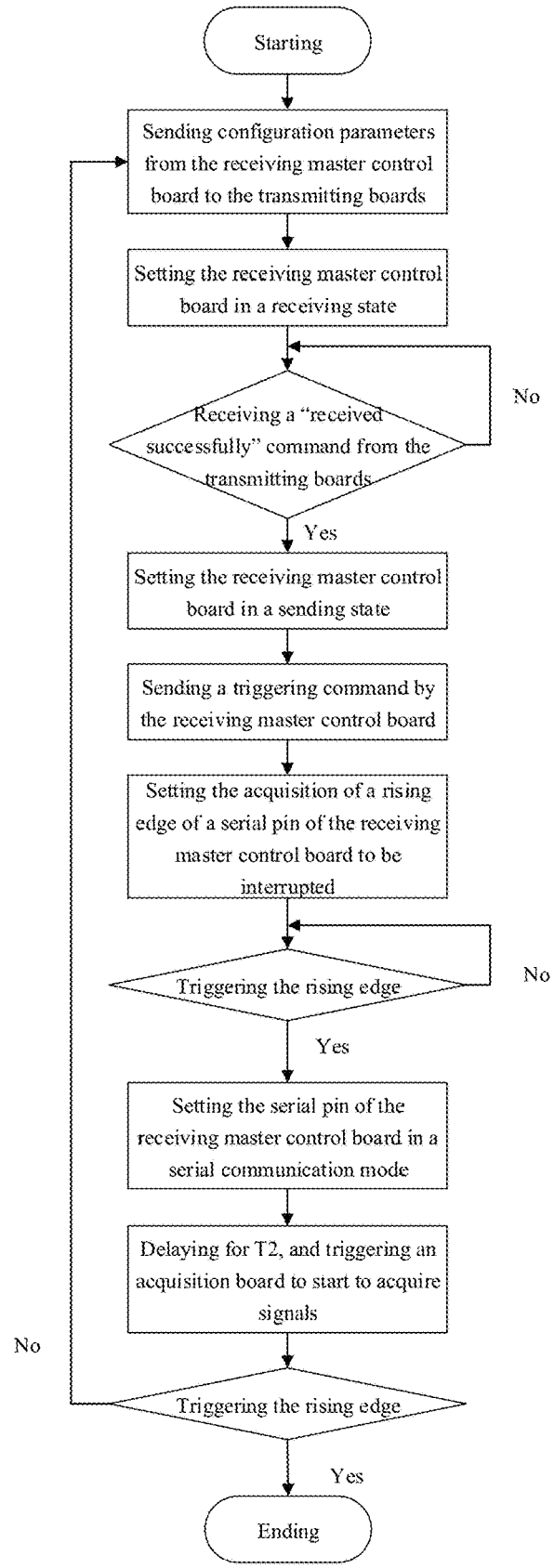
FIG. 3 is a schematic diagram of a program flow of a receiving master control board in the embodiment.
Figure 4:
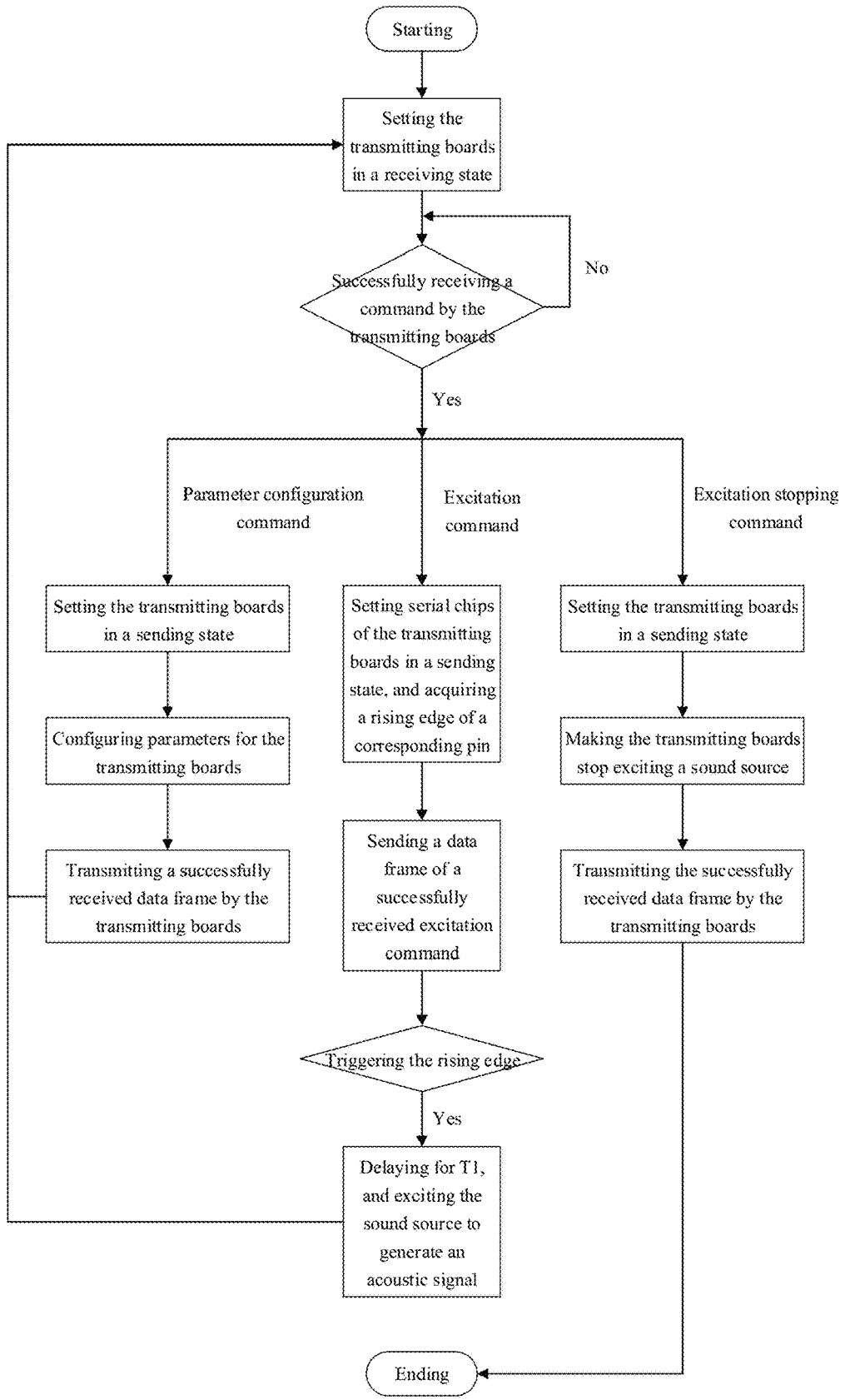
FIG. 4 is a schematic diagram of a program flow of transmitting boards in the embodiment.

In the above-mentioned embodiment, a program flow of the receiving master control board is shown as FIG. 3, and a program flow of the transmitting boards is shown as FIG. 4.

Due to the adoption of the asynchronous serial communication way, data command transmission between the transmitting terminal and the receiving terminal is realized, and meanwhile, high-voltage signal isolation between the transmitting terminal and the receiving terminal is realized. In the whole instrument, the receiving terminal serving as a master controller configures parameters for the transmitting terminal in the asynchronous serial communication way, and controls the excitation of the sound source, but the transmitting terminal is used as a synchronous sound source excitation signal initiator. Signal synchronization is realized under a hardware condition of asynchronous communication due to the coordination of the transmitting terminal and the receiving terminal. The aim of signal synchronization is achieved by asynchronous communication by sufficiently utilizing the parallel processing performance of the FPGA and the interrupt triggering function of the MCU.

Although several embodiments of the present disclosure have been given herein, it should be known by the skilled in the art that the embodiments described herein can be changed without departing from the spirit of the present disclosure. The above-mentioned embodiments are only exemplary, but should not be regarded as limitations to the scope of claims of the present disclosure.

The invention claimed is:

1. A method for synchronizing acoustic asynchronous serial signals while drilling, comprising the following steps:
    connecting a transmitting terminal to a receiving master control board through data lines R+ and R, wherein the transmitting terminal comprises a plurality of transmitting boards,
    S1: configuring, using a micro-control unit (MCU) of the receiving master control board, parameters for the plurality of transmitting boards through a driver chip, and sequentially returning, using the plurality of transmitting boards, a first command to the receiving master control board after receiving the configured parameters;
    S2: broadcasting, by the MCU of the receiving master control board, a second command for exciting a sound source to the plurality of transmitting boards using the driving chip, and changing a configuration of a pin of the MCU that corresponds to R+ from a serial communication mode to a universal input port mode, and starting a rising edge interrupt function of the pin corresponding to R+ so as to be ready to acquire a first rising edge of a signal in R+ when the plurality of transmitting boards in the transmitting terminal returns the first command to the pin corresponding to R+,
    S3, when the plurality of transmitting boards successfully receive the second command, acquiring the first rising edge of the signal in R+ by the plurality of transmitting boards;
    S4, returning, by one of the plurality of transmitting boards, a first command to the receiving master control board by utilizing a parallel processing performance of a field-programmable gate array (FPGA);
    S5, stopping acquiring the rising edge of the signal in R+, starting timing, and implementing monopole emission or quadrupole emission according to the received configured parameters after a time period $T_1$ so as to achieve different emission modes and to maintain signal synchronization of the plurality of transmitting boards;

S6, reconfiguring the pin corresponding to R+ to be in a serial communication mode so as to be ready for a following communication, starting timing, and sending a third command for starting to acquire an acoustic signal to a data acquisition circuit after a time period $T_2$; and S7, acquiring, by the data acquisition circuit, data with a certain length according to a sampling rate with a certain frequency when a time period $\Delta T=T_2-T_1$ has passed from the start of sending the acoustic signal by the sound source.

2. The method for synchronizing acoustic asynchronous serial signals while drilling according to claim 1, wherein a number of the plurality of transmitting boards is 4.

3. The method for synchronizing acoustic asynchronous serial signals while drilling according to claim 1, wherein in step S1, the parameters comprise working mode, dead time, excitation frequency, and waiting time; and the driver chip is an RS485 chip.

4. The method for synchronizing acoustic asynchronous serial signals while drilling according to claim 1, wherein in step S2, wherein a frequency for acquiring the rising edge is set to a value up to 100 MHz.

5. The method for synchronizing acoustic asynchronous serial signals while drilling according to claim 1, wherein in step S3, a frequency for the plurality of transmitting boards to acquire the first rising edge of the signal in R+ is 25 MHz.

6. The method for synchronizing acoustic asynchronous serial signals while drilling according to claim 1, wherein in step S3, the frequency for the plurality of transmitting boards to acquire the first rising edge of the signal in R+ is a clock frequency of the FPGA.

7. The method for synchronizing acoustic asynchronous serial signals while drilling according to claim 1, wherein in step S5, timing is carried out using a timer having a precision of a crystal oscillator.

8. The method for synchronizing acoustic asynchronous serial signals while drilling according to claim 1, wherein a precision of signal synchronization precision is identical to a crystal oscillator frequency, and a maximum error is controlled within one crystal oscillator clock.

* * * * *